Sept. 2, 1969   L. K. DAVIS ET AL   3,464,717
VEHICLE ACCESSORY BOX AND DETACHABLE COVER PLATE
Filed Oct. 4, 1967   2 Sheets-Sheet 1
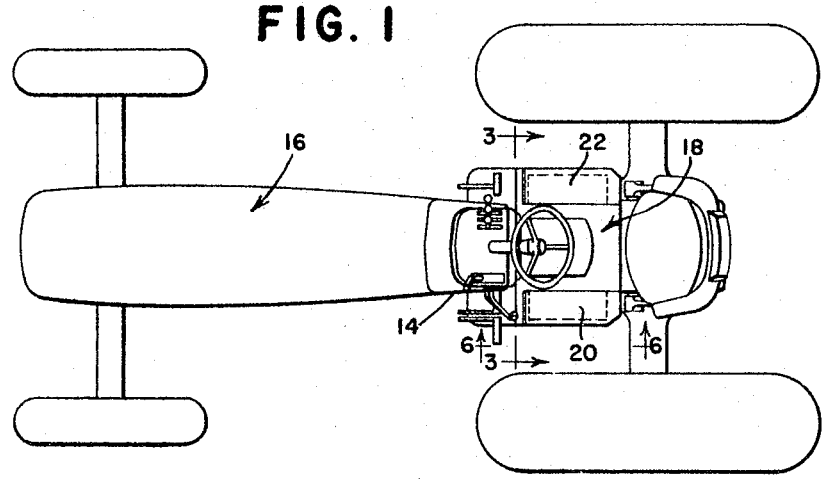
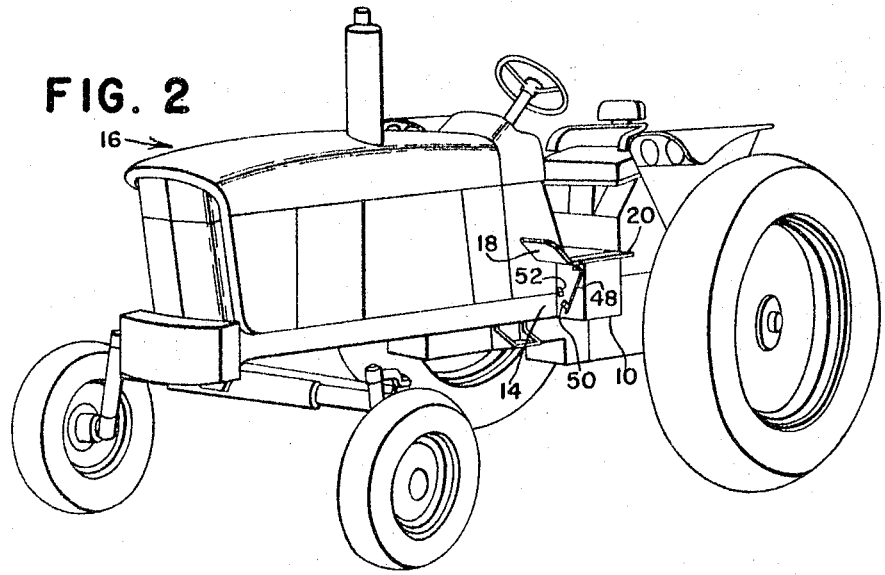
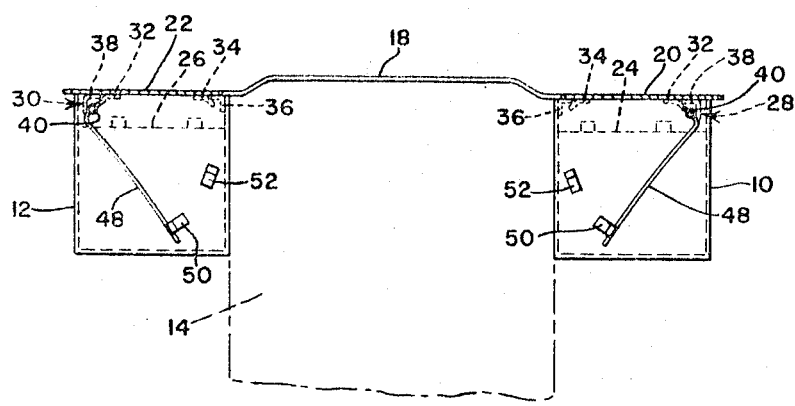

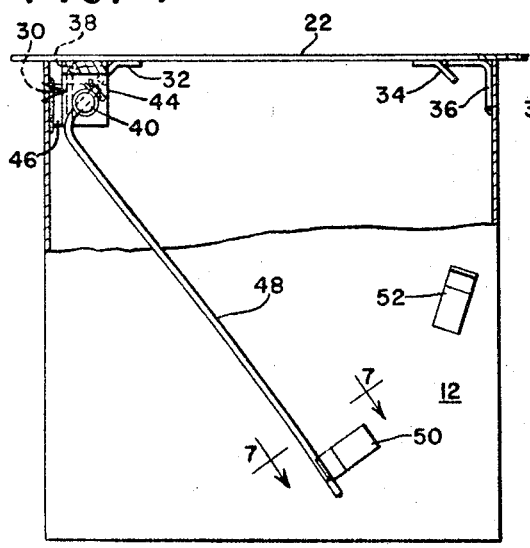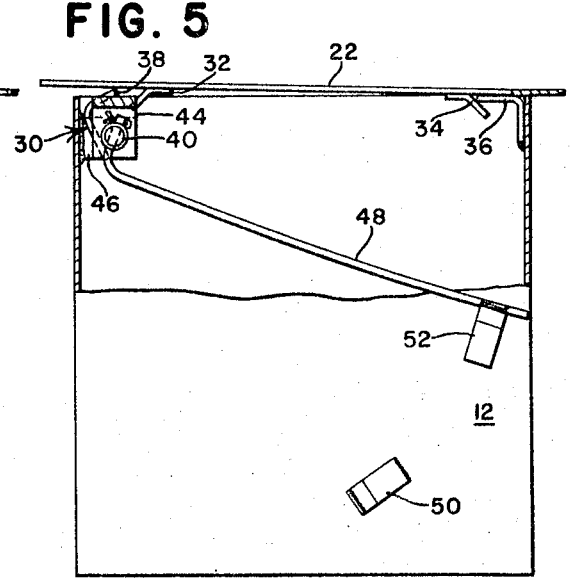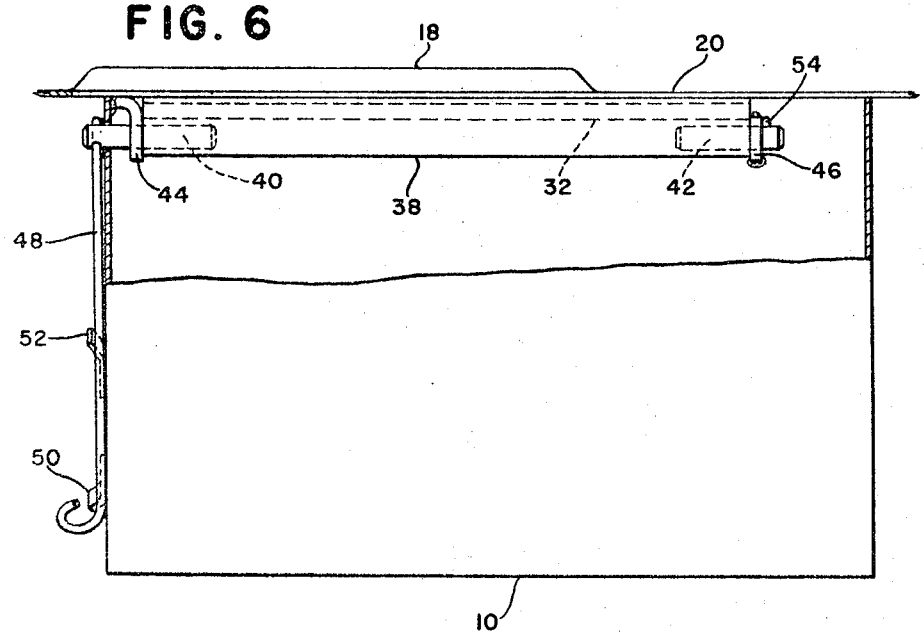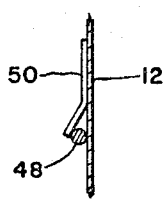

United States Patent Office 3,464,717
Patented Sept. 2, 1969

3,464,717
VEHICLE ACCESSORY BOX AND DETACHABLE COVER PLATE
Lewis K. Davis, Waterloo, and Richard D. Obadal, Cedar Falls, Iowa, assignors to Deere & Company, Moline, Ill., a corporation of Delaware
Filed Oct. 4, 1967, Ser. No. 672,856
Int. Cl. B60r 11/00, 27/00
U.S. Cl. 280—164      10 Claims

ABSTRACT OF THE DISCLOSURE

An accessory box or receptacle having a removable cover held securely in place by a spring force when latched on opposite sides by longitudinally extending, interlocking members, one or more of these accessory boxes or receptacles being mounted alongside the body of a tractor or like vehicle so that the cover or covers provide one or more footrests or extended platform areas on which an operator can safely stand.

BACKGROUND OF THE INVENTION

This invention relates to a vehicle-mounted accessory box having a removable cover secured by a spring-loaded latch mechanism and located such that the cover serves as a footrest or extended operator's platform.

Accessories have long been mounted along the sides of tractors in the vicinity of the operator, and space has always been a serious consideration. The width of the tractor must be kept to a minimum in order that the operator's view of the ground will not be unduly restricted. As a result, accessories have been mounted in various more or less inconspicuous places on the tractor, one such place being under a footrest provided for the operator along-side the tractor body and just forward of the operator's seat. One such arrangement is shown in the U.S. patent to Du Shane et al., 2,985,351. In the present invention a portion of the footrest is removable to expose a compartment below and is held securely in place by a spring-loaded latch mechanism. The latch provides a simple yet positive and dependable means of securing the removable portion while at the same time allowing complete removal for unrestricted access to the compartment below. The removable cover, or covers when used in multiples, will thus serve the double function of accessory-box cover and footrest, providing one or more extended platform areas on which an operator can safely stand.

SUMMARY OF THE INVENTION

The invention resides in an acessory box or receptacle mounted alongside the body of a tractor or like vehicle and having a removable cover which serves also as a footrest or extended operator's platform when secured in place by a latch mechanism comprising two pairs of interlocking, longitudinally extending angle-bracket members and a spring lever which can be retained so as to apply a continuous engaging pressure to the interlocking members. These two pairs of interlocking members are mounted with the members of one pair being spaced apart and rigidly attached to the bottom side of the cover and the second or engaging pair correspondingly mounted on the tractor or accessory box, one member of this engaging pair being rotatably mounted and having the spring lever affixed to one of its ends. Movement of the spring lever thus causes rotation of the attached member and results in the engagement or disengagement of the latch, the spring lever being deflected at at least one extreme of its travel and retained in latch-engaged or latch-disengaged positions behind suitably mounted retaining clips.

When unlatched, the cover may be completely removed to allow unrestricted access to the accessory compartment below. The compartment or receptacle itself consumes a minimum of usuable space, and its location provides maximum utility. The removable cover serves the double function of accessory-box cover and footrest, providing an extended platform area upon which an operator can safely stand. Several accessory boxes may be mounted on a single tractor, and, when mounted in pairs on opposite sides of the vehicle, their respective covers provide extended operator's platform areas which protrude from both sides of the vehicle body. One or more of these accessory boxes and covers can also be mounted on the vehicle so that the cover, when secured in place above the accessory box, will provide a convenient step means for use by the operator when mounting or dismounting the vehicle.

The latch mechanism is simple in construction, easily operated and requires little or no maintenance. In addition, the latch members attached to the removable cover add substantial rigidity thereto. The camming action of the rotatable latch member on the cover facilitates removal of the cover by raising one edge a short distance above the upper surface of the footrest or operator's platform while at the same time using the opposite latch members as a hinge and thereby loosening their engagement. The cover is then grasped by its raised portion and easily removed. When the cover is being secured, the camming action of the rotatable latch member forces the cover down and in a horizontal direction, thereby locating or positioning the cover while tightly securing it in place.

BRIEF DESCRIPTION OF THE DRAWINGS

FIG. 1 is a plan view of an agricultural tractor and shows the operator's platform and receptacle covers which form a part thereof.

FIG. 2 is a front perspective view of the tractor showing the left-hand receptacle mounted alongside the tractor body below the operator's platform.

FIG. 3 shows an outline of the tractor body with the two receptacles and the operator's platform mounted thereon as viewed from the front.

FIG. 4 shows the cover and latch mechanism of the right-hand receptacle in its latched position and viewed from the front.

FIG. 5 is similar to FIG. 4 but shows the latch mechanism in the unlatched position.

FIG. 6 is an enlarged view of the receptacle along line 6—6 in FIG. 1 with a portion of the receptacle cut away to reveal the latch mechanism.

FIG. 7 is a section on the line 7—7 of FIG. 4.

DESCRIPTION OF THE PREFERRED EMBODIMENT

For the purpose of description, the present invention is shown in conjunction with a typical agricultural tractor, and terms such as "forwardly," "rearwardly," "transversely," longitudinally," etc., are used with reference to the direction of tractor travel and merely to aid in the description and not to be construed as limitations.

A pair of accessory boxes 10 and 12, each having a bottom and upright sides, are open at their tops and rigidly mounted on either side of the body 14 of the tractor 16 below an operator's platform 18. Portions 20 and 22 of the operator's platform 18 which are directly above the accessory boxes 10 and 12, respectively, are removable and thus serve a second function as accessory-box covers. When in place, the covers 20 and 22 are coplanar with and essentially a part of the operator's platform 18, and they conceal the presence of the accessory boxes 10 and 12 and their contents, appearing to the casual observer as a natural part of the platform. The accessory boxes or compartments 10 and 12 are ideally suited for and are shown here, for example, as containing storage batteries 24 and 26, respectively.

The covers 20 and 22 are respectively held securely in place by latch mechanisms indicated in their entireties by the numerals 28 and 30, respectively. For the sake of simplicity, only one of these latch mechanisms will be described in detail, it being understood that the latch mechanisms 28 and 30 are essentially alike, one being the left-hand of the other.

The latch mechanism 30 comprises a pair of longitudinally disposed angle-bracket or members 32 and 34 spaced apart and rigidly attached to the bottom surface of the cover 22, an angle-bracket or lip member 36 rigidly attached to the accessory box 12, an angle-bracket or lip member 38 rotatably mounted by means of drilled pins 40 and 42 on brackets 44 and 46 which are rigidly attached to and extend from one inside wall of the accessory box 12, a lever 48 of spring steel or like material with a right-angle bend at one end which fits through the drilled hole in the pin 40, and a pair of retaining clips 50 and 52 suitably located on the outside surface of the forwardly disposed end of the accessory box 12 and rigidly attached thereto. The drilled pins 40 and 42 are rigidly fastened to the inside surface of the outer portion of one leg of the angle member 38, being coaxial and parallel to the angle member. The pins 40 and 42 fit through holes in brackets 44 and 46 respectively and are retained there by a cotter pin 54 through the drilled hole in pin 46 and the bent end of the spring lever 48 through the drilled hole in pin 44. Latching, then, is accomplished by the rotation of member 38 by means of the spring lever 48. All of the angle-bracket members 32, 34, 36, and 38 are parallel to one another when the cover 22 is in place; and, as member 38 is rotated into engagement with member 32, member 34 is consequently urged into a firm engagement with member 36. The rotating member 38 simultaneously forces the cover 22 downwardly and in a horizontal direction towards member 36, thereby securing it against both horizontal and vertical movement. When the latch is tightly engaged, the spring lever 48 is deflected a short additional distance and retained behind a retaining clip 50 which is located as shown in FIG. 3. This deflection of the spring lever 48 results in a continuous load on the latch so that the cover 22 is held securely in place despite considerable external impact.

The cover 22 is easily removed, however, once the latch is released. This is accomplished by merely releasing the spring lever 48 from behind retaining clip 50 and forcing it to a second retained position behind retaining clip 52. This rotates member 38 so as to disengage it from member 32 and thereby also releases the engaging pressure previously applied to members 34 and 36. The spring lever is also deflected somewhat to the unlatched position behind retaining clip 52, and the resulting spring force holds the latch open against external impact. The rotating member 38 acts as a cam against the removable cover 22 and, as it rotates, raises the edge of the cover above the surface of the footrest or platform 18, using member 36 as a hinge. This motion of the cover 22 also tends to loosen the engagement between members 34 and 36, allowing the cover to be lifted easily from the vehicle 16.

We claim:

1. In a vehicle, the combination of: at least one receptacle structure carried by the vehicle and having a bottom, upright sides and an open top defined in part by right- and left-hand positions of said sides; a cover for removably closing said top; and latch mechanism for securing the cover in place and comprising separable left-hand connection means including first lip means on and projecting rightwardly from said left-hand edge portion and first tongue means on the inside of the cover and diverging leftwardly and away therefrom for releasably engaging leftwardly and under said first lip means to draw the left part of the cover against said left-hand edge portion; and right-hand releasable and force-applying means including second tongue means on the inside of the cover and diverging rightwardly and away therefrom in proximity to the right-hand edge portion, second lip means carried by the structure at said right-hand edge portion for selective rocking between a locking position, in which said second lip means hooks leftwardly into said second tongue means to draw the right-hand part of the cover against said right-hand edge portion and to simultaneously apply a force through the cover to tighten the engagement between the first tongue and lip means, and a releasing position, in which said second lip means moves rightwardly out of and free from said second tongue means to relax the aforesaid force so as to enable the cover to be removed by movement thereof to separate the first tongue means from the first lip means, lever means attached to and for rotating the second lip means, and means for releasably retaining the lever in at least the locking position of the second lip means.

2. The invention defined in claim 1 wherein the removable cover, when in place, forms a rigid, flat, horizontal surface extending out from the body portion of the vehicle.

3. The invention defined in claim 1 wherein the receptacle structure is mounted alongside the body of the vehicle and beneath a horizontally disposed platform mounted on said body such that the removable cover, when in place, forms a lateral extension of said platform.

4. The invention defined in claim 1 wherein the lateral extension of the platform formed by the cover is coplanar with a portion of said platform.

5. The invention defined in claim 1 wherein a plurality of receptacle structures are mounted on said vehicle in at least one pair, the receptacle structure of such pair being mounted in transverse alinement on opposite sides of the vehicle body.

6. Latch mechanism for securing a removable cover in its closed position to a structure having an opening defined in part by spaced apart right- and left-hand edge portions, comprising: separable left-hand connection means including first lip means on and projecting rightwardly from said left-hand edge portion and first tongue means on the inside of the cover and diverging leftwardly and away therefrom for releasably engaging leftwardly and under said first lip means to draw the left part of the cover against said left-hand edge portion; and right-hand releasable and force-applying means including second tongue means on the inside of the cover and diverging rightwardly and away therefrom in proximity to the right-hand edge portion, second lip means carried by the structure at said right-hand edge portion for selective rocking between a locking position, in which said second lip means hooks leftwardly into said second tongue means to draw the right-hand part of the cover against said right-hand edge portion and to simultaneously apply a force through the cover to tighten the engagement between the first tongue and lip means, and a releasing position, in which said second lip means moves rightwardly out of and free from said second tongue means to relax the aforesaid force so as to enable the cover to be removed by movement thereof to separate the first tongue means from the first lip means, lever means attached to and for rotating the second lip means, and means for releasably retaining the lever in at least the locking position of the second lip means.

7. The invention defined in claim 6, including means for retaining the lever in the releasing position of said second lip means.

8. The invention defined in claim 6, in which the lever means is of elastic material so that, when it is retained, it exerts a biasing force on the second lip means.

9. The invention defined in claim 6, in which the second lip means includes an extension portion adapted, when said second lip means is rotated toward its releasing position, to engage the inside of the cover and to move the right-hand part of said cover away from the right-hand edge portion of said structure.

10. The invention defined in claim 6, in which the edge portions are parallel to each other and the first and second tongue and lip means include elongated members parallel to each other and to said edge portions.

References Cited

UNITED STATES PATENTS

| | | | |
|---|---|---|---|
| 1,488,720 | 4/1924 | Tichy et al. | 280—164 |
| 1,542,342 | 6/1925 | Doctor | 280—164 |
| 1,556,601 | 10/1925 | Hills | 280—164 |
| 2,981,554 | 4/1961 | Mulder et al. | 280—164 |

LEO FRIAGLIA, Primary Examiner

JOEL E. SIEGEL, Assistant Examiner

U.S. Cl. X.R.

220—55

PO-1050
(5/69)

UNITED STATES PATENT OFFICE
CERTIFICATE OF CORRECTION

Patent No. 3,464,717                    Dated   2 September 1969

Inventor(s)  Lewis K. Davis and Richard D. Obadal

It is certified that error appears in the above-identified patent and that said Letters Patent are hereby corrected as shown below:

Column 4, line 39, change "1" to -- 2 --; column 4, lines 44 and 47, change "1" (both occ.) to -- 3 --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents